US 6,554,464 B1

(12) United States Patent
Hawryluk et al.

(10) Patent No.: US 6,554,464 B1
(45) Date of Patent: Apr. 29, 2003

(54) APPARATUS FOR AND METHOD OF REDUCING OR ELIMINATING INTERFERENCE EFFECTS IN A LIGHT TUNNEL ILLUMINATOR

(75) Inventors: Andrew M. Hawryluk, Los Altos Hills, CA (US); Yu Chue Fong, Fremont, CA (US); David G. Stites, Los Altos, CA (US); Weijian Wang, San Jose, CA (US)

(73) Assignee: Ultratech Stepper, Inc., San Jose, CA (US)

( * ) Notice: Subject to any disclaimer, the term of this patent is extended or adjusted under 35 U.S.C. 154(b) by 0 days.

(21) Appl. No.: 09/505,268

(22) Filed: Feb. 16, 2000

(51) Int. Cl.$^7$ ................................. F21V 8/00
(52) U.S. Cl. .................. 362/582; 362/551; 362/259
(58) Field of Search .................... 385/33, 34, 901, 385/32; 362/582, 551, 560, 558, 259

(56) References Cited

U.S. PATENT DOCUMENTS

| | | | |
|---|---|---|---|
| 3,439,157 A | * | 4/1969 | Myles |
| 4,511,220 A | | 4/1985 | Scully ......................... 350/403 |
| 4,521,075 A | | 6/1985 | Obenschain et al. ... 350/162.11 |
| 4,744,615 A | | 5/1988 | Fan et al. .................. 350/96.1 |
| 4,750,798 A | * | 6/1988 | Whitehead ................. 350/96.1 |
| 5,224,200 A | | 6/1993 | Rasmussen et al. ........ 385/146 |
| 5,671,306 A | * | 9/1997 | York et al. ..................... 385/36 |
| 5,797,674 A | * | 8/1998 | Nagayama .............. 362/259 X |
| 6,160,948 A | * | 12/2000 | McGaffigan ................ 362/559 |
| 6,234,656 B1 | * | 5/2001 | Hosseini et al. ............ 362/556 |

OTHER PUBLICATIONS

Laser Focus World, Oct. 2002, pp. 82–85, *Back to Basics Beam Characterization: Good Fundamentals*, Stephen J. Matthews, Contributing Editor.*

* cited by examiner

Primary Examiner—Laura K. Tso
(74) Attorney, Agent, or Firm—Allston L. Jones

(57) ABSTRACT

A light tunnel (24) comprising a hollow light tunnel body (30) or a solid light tunnel body (80) having a central axis (A1 or A2), a reflective surface (42 or 84) facing the axis, and an output end (54 or 94) having an edge (60 or 106) with a chamfered surface (120 or 130) formed on the edge. The chamfered surface is designed to alter the reflective properties of the reflective surfaces of the light tunnel body near the output end so as to reduce or eliminate edge ringing from the light tunnel body edge. In the case of a knife-edge (340) placed at the output end of the light tunnel body, knife-edge ringing is eliminated by providing a light source (310) in the form of a laser with a large number of spatial modes ($M^2 > 30$). The present invention is expected to be most useful in cases where time-averaging or other interference-eliminating means prove impossible or impractical, such as with applications requiring only one or a few high-irradiance light pulses that need to uniformly irradiate a workpiece.

17 Claims, 2 Drawing Sheets

APPARATUS FOR AND METHOD OF REDUCING OR ELIMINATING INTERFERENCE EFFECTS IN A LIGHT TUNNEL ILLUMINATOR

FIELD OF THE INVENTION

The present invention pertains to systems to uniformize illumination, and in particular to such systems employing a light tunnel as an optical integrator.

BACKGROUND OF THE INVENTION

Achieving uniform illumination is necessary in numerous optical applications, including microscopy, and various other forms of imaging, such as photolithography. Many illumination uniformity techniques have evolved over the years for the variety of imaging applications. With the advent of the laser in the 1960's, new techniques have to be developed to deal with non-uniformities arising from interference effects due to the coherent nature of laser light.

In many applications, such as microlithography, or materials processing, it is desirable to illuminate an object with a light beam having an intensity distribution that is both macroscopically and microscopically spatially uniform. Here, "macroscopic" means dimensions comparable to the size of the object being illuminated and "microscopic" means dimensions comparable to the size of the wavelength of light used. In many of these applications, it is further desirable to use a pulsed laser source.

However, the output of most lasers is spatially non-uniform. Macroscopically, the laser output often has a gaussian-like profile. A great deal of effort has gone into fabricating lasers with more "square" profiles, but even these are only uniform to +/-5-10% over limited areas. As a result, it is often necessary to use auxiliary optics in conjunction with the laser source in an attempt to make the illumination more uniform.

The greatest challenge in producing uniform illumination from a laser source arises from the inherent temporal and spatial coherence of the laser source. When two incoherent beams overlap, the intensities of the two beams are added. However, when two coherent beams overlap, the electric fields of the two beams are added and can produce interference patterns. (fringes) that are absent in an incoherent illumination system. As a result, the traditional methods used to produce uniform illumination with incoherent sources are not suitable for laser sources. This is particularly true where the application utilizes only one or a few pulses so that time-averaging to achieve uniformization is not a practical option.

FIGS. 1a and 1b show schematic cross-sectional diagrams of conventional illumination uniformizer apparatus 4 and 8, respectively, for achieving macroscopic illumination through the use of a light tunnel. Apparatus 4 and 8 both include a pulsed light source 10 emitting pulses of coherent light 12, a condenser optical system 16, and a light tunnel 24.

In apparatus 4 (FIG. 1a), light tunnel 24 comprises a hollow light tunnel body 30 with a central axis A1, an upper wall 34 and a lower wall 38, each with a highly reflective inner surface 42 and 44, respectively, an input end 50 and an output end 54. The latter includes upper and lower edges 60 and 62, respectively. An exemplary material for walls 34 and 38 of hollow light tunnel body 30 is any material that is coated with a highly reflective surface such as metallic coatings or dielectric coatings.

In apparatus 8 (FIG. 1b), light tunnel 24 comprises a solid light tunnel body 80 having a central axis A2, an index of refraction n1, upper and lower surfaces 84 and 86, respectively, which reflect light via total internal reflection (TIR) (as such, these surfaces can be considered reflective surfaces), and input and output ends 90 and 94, respectively. Output end 94 includes upper and lower edges 106 and 108, respectively. Solid light tunnel body 80 works best when it is made from an optically transparent material with a high index of refraction, such as glass, fused quartz or $Al_2O_3$.

Apparatus 4 and 8 are commonly used to achieve macro-uniformities of approximately +/-1% uniformity. However, because of the coherent nature of lasers, these illumination methods produce significant micro-non-uniformities.

With continuing reference to FIGS. 1a, 1b, above, coherent light 12 from the light source 10 is condensed by condenser optical system 16 and enters light tunnel 24 at entrance end 50 or 90 over a range of angles. Two light rays 100 and 102 are shown, with light ray 100 representing a central, straight-through ray, and ray 102 representing a ray having a single reflection (bounce) off inner surface 44 or 86. Other rays having more bounces are typically present, but are not shown. Light rays 100 and 102 then exit the light tunnel at output end 54 or 94 at various angles and output end positions. "Edge rays" are the light rays that exit the light tunnel at or near edges 60 and 62, or 106 and 108, of the output end.

A phenomenon called "edge-ringing" occurs when a coherent edge ray "folds" or "reflects" and interferes with itself. In other words, edge-ringing occurs where a reflected edge ray (e.g., ray 102) overlaps (interferes) with a non-reflected edge ray. This edge-ringing is related to the spatial coherence of light source 10. The greater the spatial coherence of light source 10, the greater the edge-ringing. Here, "ringing" refers to the damped sinusoidal variation in the irradiance distribution of light I(x) as a function of the distance x across output end 54 or 94 of light tunnel 24, such as shown in FIG. 2, where "x" is the distance from the edge of the light tunnel towards the center. The vertical dashed line corresponds to the edge of the light tunnel edge (e.g., edge 106) or a knife-edge placed at the output end 54 or 94. Larger values of "x" extend away from the edge and towards the center of the light tunnel.

Two types of edge-ringing can occur in light tunnels. The first type, described above, is caused by coherent light rays (edge rays) interacting with other rays near edges 60 and 62 or 106 and 108 at the output end of a light tunnel. The second type is coherent light rays interacting with a "knife-edge" placed near the center of output end 54 or 94 of light tunnel 24, as mentioned above. For example, a knife-edge might be placed at output end 54 or 94 to reduce the size of the downstream illumination field (not shown).

Traditionally, use of light tunnels in combination with spatially coherent light sources does not work well because the coherence of the laser beam leads to non-uniformities at the output of the light tunnel. The coherence of the laser produces both interference fringes in the light tunnel (from overlapping orders) and ringing at the edges of the light tunnel, which results in illumination non-uniformity.

There are several prior art designs for reducing interference effects in light tunnels. Unfortunately, each has significant shortcomings.

U.S. Pat. No. 4,744,615, entitled "Laser beam homogenizer," describes an apparatus wherein a coherent laser beam having a possibly non-uniform spatial intensity distribution is transformed into an incoherent light beam having a substantially uniform spatial intensity distribution by homogenizing the laser beam with a light tunnel (a transparent light passageway having flat internally reflective side surfaces). It has been determined that when the cross-section of the tunnel is a polygon (as preferred) and the sides of the tunnel are all parallel to the axis of the tunnel (as preferred), the laser light at the exit of the light tunnel (or alternatively at any image plane with respect thereto) will have a substantially uniform intensity distribution and will be incoherent only when the aspect ratio of the tunnel (length divided by width) equals or exceeds the co-tangent of the input beam divergence angle theta and when $W_{min} = L_{coh}(R+\sqrt{1+R^2})) > 2RL_{coh}$, where $W_{min}$ is the minimum required width for the light tunnel, $L_{coh}$ is the effective coherence length of the laser light being homogenized and R is the chosen aspect ratio for the light tunnel. A shortcoming of this technique, however, is that the light tunnel is required to have certain dimensions defined by the coherence properties of the light. This adds an additional constraint to the design of the illumination system.

U.S. Pat. No. 5,224,200, entitled "Coherence delay augmented laser beam homogenizer," describes a system in which the geometrical restrictions on a laser beam homogenizer are relaxed by using a coherence delay line to separate a coherent input beam into several components each having a path length difference equal to a multiple of the coherence length with respect to the other components. The components recombine incoherently at the output of the homogenizer, and the resultant beam has a more uniform spatial intensity suitable for microlithography and laser pantogography. Also disclosed is a variable aperture homogenizer, and a liquid filled homogenizer. This system is not practical, however, where a high-degree of uniformity is required, because of the large number of separate paths that need to be constructed.

U.S. Pat. No. 4,511,220, entitled "Laser target speckle eliminator," describes an apparatus for eliminating the phenomenon of speckle with regard to laser light reflected from a distant target whose roughness exceeds the wavelength of the laser light. The apparatus includes a half plate wave member, a first polarizing beam splitter member, a totally reflective right angle prism, and a second polarizing beam splitter member, all of which are in serial optical alignment, that are used in combination to convert a linearly (i.e., vertically) polarized light beam, which is emitted by a laser having a known coherence length, into two coincident, orthogonally polarized, beams that are not coherent with each other, and that have an optical path difference which exceeds the known coherence length of the emitting laser, to eliminate the speckle. This apparatus, however, requires numerous elements, and is relatively complex.

U.S. Pat. No. 4,521,075, entitled "Controllable spatial incoherence echelon for laser," describes a system for achieving very uniform illumination of a target. A beam of broadband spatially-coherent light is converted to light with a controlled spatial incoherence and focused on the target. An echelon-like grating breaks the beam up into a large number of differently delayed beamlets with delay increments larger than the coherence time of the beam, and a focusing lens overlaps the beamlets to produce at the target a complicated interference pattern modulated by a smooth envelope that characterizes the diffraction of an individual beamlet. On time scales long compared to the coherence time, the interference pattern averages out, leaving only the smooth diffraction envelope. This system, however, requires time averaging, which for many applications is not possible due to the short exposure times.

SUMMARY OF THE INVENTION

The present invention pertains to systems to uniformize illumination, and in particular to such systems employing a light tunnel as an optical integrator.

A first aspect of the invention is a light tunnel comprising a light tunnel body having a central axis, a reflective surface facing the axis, and an output end having an edge, with a chamfered surface formed on the edge. The chamfered surface is designed so as to reduce or eliminate interference effects between coherent light rays passing through the light tunnel body near the edge ("edge-ringing"). The chamfered surface preferably has a chamfer width d that is at least half the coherence length of the light passing through the light tunnel body. The light tunnel body may be hollow or solid.

A second aspect of the invention is an illumination uniformizer system comprising, in order along an optical axis, a coherent light source for generating coherent light, a condenser optical system, and the light tunnel as described above, arranged to receive the coherent light over a range of angles from the condenser optical system.

A third aspect of the invention is a method of eliminating edge-ringing due to interference effects from coherent light passing through a light tunnel having either a hollow or solid light tunnel body with an output end having an outer edge. The method comprises the steps of first, providing a chamfer on the outer edge, and then passing the coherent light through the light tunnel at different angles. In the case of a solid light tunnel body, a portion of the coherent light passes through the chamfer. In the case of a hollow light tunnel body, a portion of the light passes immediately adjacent the chamfer where it would have otherwise reflected without the presence of the chamfer, or reflects off the chamfer.

A fourth aspect of the invention is an illumination uniformizer system comprising, in order along an optical axis, a multi-mode laser having an $M^2$ value greater than 30 for generating coherent light, a condenser optical system, and a light tunnel arranged to receive the coherent light over a range of angles from the condenser optical system. Such a system can be used to eliminate edge ringing due to a knife-edge placed at the output end of the light tunnel, or from an edge of the light tunnel itself.

DETAILED DESCRIPTION OF THE INVENTION

The present invention pertains to systems to uniformize illumination, and in particular to such systems employing a light tunnel as an optical integrator.

Figure 1A:
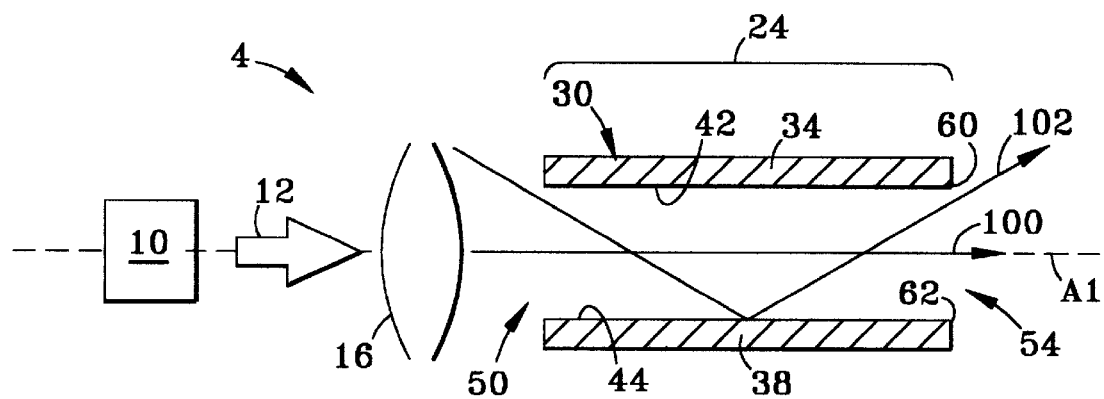
FIG. 1a is a cross-sectional schematic diagram of a section of a prior art illumination uniformizing apparatus having a light tunnel with hollow light tunnel body.
Figure 3A:
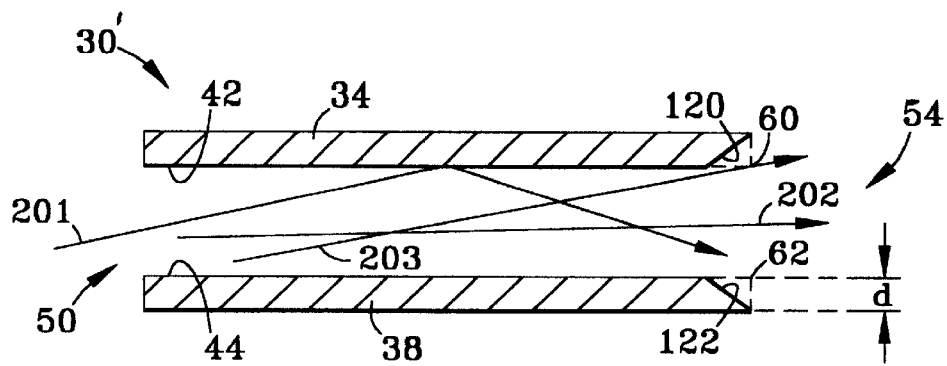
FIG. 3a is a cross-sectional diagram of a hollow body light tunnel with the chamfer of the present invention.

With reference now to FIG. 3a, hollow light tunnel body 30', as described with respect to hollow light tunnel body 30 in FIG. 1a, now further includes the novel modification of chamfered surfaces ("chamfers") 120 and 122 on edges 60 and 62, respectively, at output end 54. Chamfers 120 and 122 respectively connect reflective surfaces 42 and 44 to output end 54. Chamfers 120 and 122 have an effective width d ("the chamfer width"), which is preferable greater than half of the spatial coherence of the light from light source 10 (see FIGS. 1a, 1b). For example, for a laser having a spatial coherence length of 200 microns, the chamfer width d is preferably equal to or greater than 100 microns.

Figure 1B:
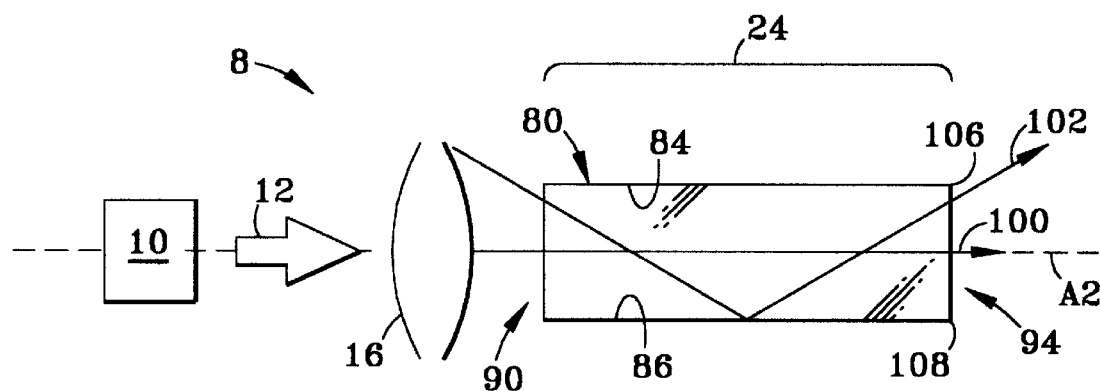
FIG. 1b is a cross-sectional schematic diagram of a section of a prior art illumination uniformizing apparatus having a light tunnel with solid light tunnel body.
Figure 2:
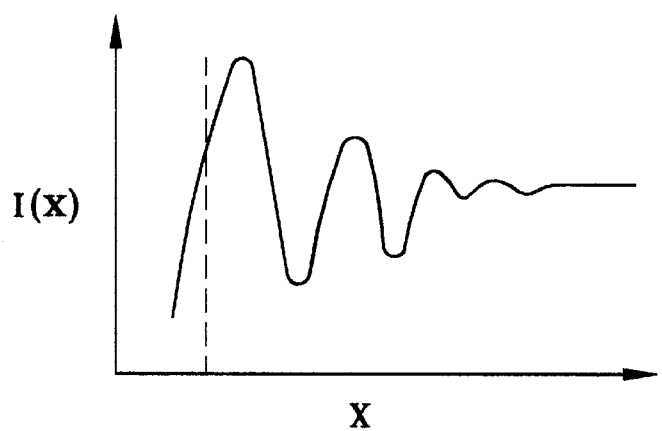
FIG. 2 is a prior art schematic plot of irradiance I vs. distance x across output end of a light tunnel when coherent light is input into the light tunnel and edge-ringing results.
Figure 3B:
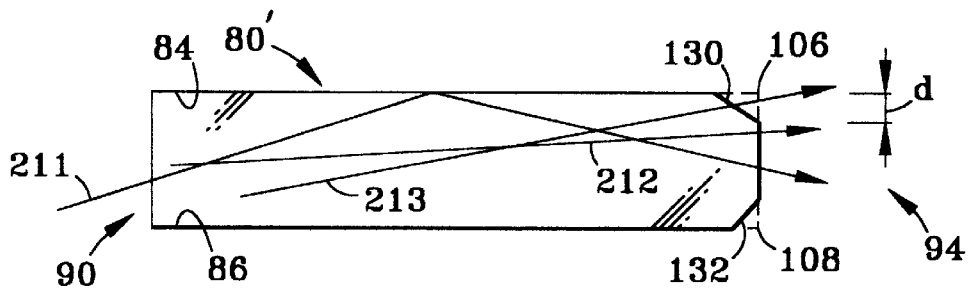
FIG. 3b is a cross-sectional diagram of a solid body light tunnel with the chamfer of the present invention.

Likewise, with reference to FIG. 3b, solid light tunnel body 80', as described with respect to solid light tunnel body 80 in FIG. 1b, now further includes the novel modification of chamfers 130 and 132 on edges 106 and 108, respectively. Chamfers 130 and. 132 respectively connect reflective surfaces 84 and 86 to output end 94, and have a chamfer width d, as defined above.

Chamfers 120 and 122, and 130 and 132 eliminate the ringing from output edges 60 and 62, and 106 and 108, respectively, as follows. In the case of hollow light tunnel body 30', chamfers 120 and 122 serve to change or eliminate the reflection characteristics of upper and lower reflective surfaces 42 and 44, respectively, for a short distance near output end 54, which impacts the behavior of certain edge rays. In the case of solid light tunnel body 80', chamfers 130 and 132 change or eliminate the total-internal-reflection conditions of upper and lower reflective surfaces 84 and 86, respectively, near output end 94, which impacts the behavior of certain edge rays. As a result, in the case of hollow light tunnel body 30' or solid light tunnel body 80', the non-reflected beam does not have a reflected beam with which to interfere.

More specifically, for the case of hollow light tunnel body 30' (FIG. 3a), a light ray 201 undergoes a reflection from reflective upper surface 42 and passes through the light tunnel body and out output end 54. Light ray 201 then Intersects a light ray 202 also traveling through hollow light tunnel body 30', but which is not spatially coherent with light ray 201. Therefore, light rays 201 and 202 do not interfere. A third light ray 203, which is spatially coherent with light ray 202, passes through output end 54 where it would have otherwise undergone reflection from reflective upper surface 42 but for the presence of chamfer 120. Alternatively, light ray 203 is incident chamfer 120 and reflects from the chamfered surface at a different angle than it would have otherwise reflected without the presence of the chamfer. Either way, light ray 203 does not interfere with light ray 202.

For the case of a solid light tunnel body (FIG. 3b), a light ray 211 undergoes total internal reflection from reflective upper surface 84 and passes through the light tunnel body and out output end 94. Light ray 211 then intersects with a light ray 212 also traveling through solid light tunnel body 80', but which is not spatially coherent with light ray 211. Therefore, light rays 211 and 212 do not interfere. A third light ray 213, which is spatially coherent with light ray 212, is incident upon chamfer 106 and passes therethrough. Therefore, light ray 213 does not interfere with light ray 212.

An alternative way of eliminating edge-ringing due to interference effects from coherent light is to attempt to reduce the coherence of the light emanating from the light source, or to use an incoherent light source. As discussed above, most prior art techniques attempt to reduce coherence effects by reducing the (relative) coherence of the light after it leaves a coherent light source. One reason for this is that a preferred light source for many if not most modern-day photo-processing applications is a laser, which can provide high-irradiance light with very short temporal pulse lengths. For many applications, the illumination of a workpiece, for example, can be made uniform by time-averaging over tens or hundreds of pulses. However, for certain applications, such as laser thermal processing of semiconductor devices, only one or several short high-irradiance pulses can be used at a time, so that time-averaging of non-uniformities is not a practical option.

Figure 4:
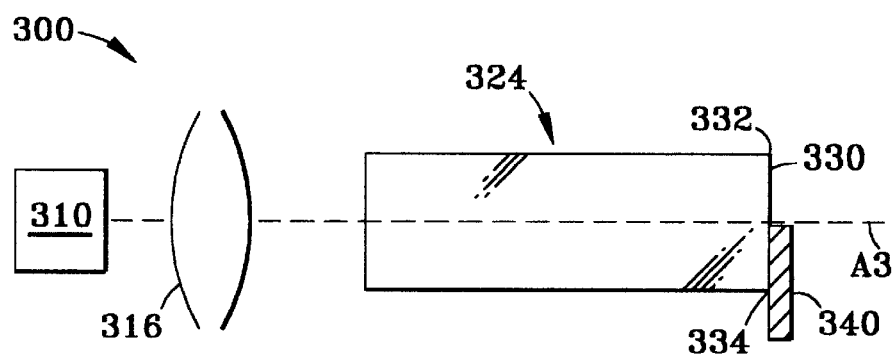
FIG. 4 is a cross-sectional diagram of a section of an illumination uniformizing apparatus having a high spatial mode light source, and a knife-edge at the light tunnel output end.

Accordingly, with reference to FIG. 4, a light tunnel illumination apparatus 300 of the present invention comprises, along a central axis A3, a light source 310, a condenser optical system 316, and a light tunnel 324 with an output end 330 with edges 332 and 334. Light tunnel 324 can comprise either a hollow light tunnel body such as body 30 (FIG. 1a) or a solid light tunnel body such as body 80 (FIG. 1b). A knife-edge 340 is shown arranged at output end 330. The present invention reduces or eliminates edge-ringing from edge 332 and/or knife-edge 340 by virtue of light source 310 having a large apparent spatial extent. This is most easily achieved by employing a laser having a large etendue and a large number of spatial modes, which is generally characterized by the laser parameter $M^2$. The parameter $M^2$ is a measure of the divergence of the laser beam relative to the divergence of a diffraction-limited laser beam, and is valid for all types of lasers. The number of spatial modes in a laser is approximately given by the value $(M^2)^2$.

The present inventors have determined that, when using a laser with a large etendue (>50 mm-mrad), the edge-ringing from knife-edge 340 and from edge 332 is noticeably reduced. Typical modern lasers have small values of $M^2$ (ranging from 1–3) and small etendues (<20 mm-mrad) making them close to "diffraction-limited" quality. However, a diffraction-limited laser produces the greatest amount of edge-ringing from a light tunnel edge or a knife-edge. Lasers with etendues greater than 50 mm-mrad significantly reduce edge-ringing. Edge-ringing can be nearly eliminated for etendue values greater than 100 mm-mrad and $M^2>30$.

An exemplary light source 310 is a Nd:YAG laser, a Nd:glass laser, an Alexandrite laser, and a Ti:Saphire laser, each modified to operate at large number of spatial modes (e.g., $M^2>150$), and preferably operating with sub-millisecond pulse lengths. These lasers can be operated at their natural lasing frequency, or can be frequency multiplied (i.e., frequency doubled, tripled or quadrupled). It is worth noting that such light sources, while known in theory, are apparently not readily commercially available and difficult if not impossible to find since they have historically had no practical applications. However, existing light sources can be modified to have the properties of the above-described light source 310. The present inventors were able to have a suitable laser modified by Continuum, Inc., Santa Clara, Calif., to serve as light source 310.

As mentioned above, the elimination of edge-ringing or knife-edge ringing is particularly important in applications where time-averaging or other methods of eliminating interference effects while using a coherent light source is not possible or practical. Accordingly, the present invention will be most useful in applications where only one or a few high-irradiance light pulses are used to irradiate a workpiece with a high degree of uniformity. One such application is laser thermal processing of substrates (e.g., semiconductor wafers).

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A light tunnel comprising a light tunnel body having a central axis, a reflective surface facing said axis and an output end having an edge, with a chamfered surface formed on said edge.

2. A light tunnel according to claim 1, where said chamfered surface is designed so as to reduce or eliminate interference effects between coherent light rays passing through said light tunnel body.

3. A light tunnel according to claim 1, wherein said light tunnel body is hollow and includes an outer surface arranged radially outward of said reflective surface, and wherein said chamfered surface faces said central axis and forms an angle relative to said central axis.

4. A light tunnel according to claim 1, wherein said light tunnel body is solid, and wherein said chamfered surface faces away from said central axis and forms an angle relative to said central axis.

5. A light tunnel according to claim 1, wherein said light tunnel body is made of a material selected from the group of materials comprising: optical glass, fused silica, quartz and $Al_2O_3$.

6. A light tunnel according to claim 1, wherein said chamfered surface has a chamfer width d equal to or greater than half the coherence length of coherent light passing through said light tunnel body.

7. An illumination uniformizer system comprising, in order along an optical axis:
   a) a coherent light source for generating coherent light;
   b) a condenser optical system; and
   c) a light tunnel according to claim 1 arranged to receive said coherent light over a range of angles from said condenser optical system.

8. An illumination uniformizer system comprising, in order along an optical axis:
   a) a multi-mode laser having an $M^2$ value greater than 30, for generating coherent light;
   b) a condenser optical system; and
   c) a light tunnel arranged to receive said coherent light over a range of angles from said condenser optical system.

9. An illumination uniformizer system according to claim 8, wherein said laser has an etendue of greater than 50 mm-mrad.

10. An illumination uniformizer system according to claim 8, wherein said light tunnel is the light tunnel according to claim 1.

11. An illumination system according to claim 9, wherein said light tunnel is the light tunnel according to claim 1.

12. A method of eliminating edge-ringing due to interference effects from coherent light passing through a light tunnel having a solid light tunnel body with an output end having an outer edge, comprising the steps of:
   a) providing a chamfer on the outer edge; and
   b) passing the coherent light through the light tunnel at different angles, with a portion of the coherent light passing through said chamfer.

13. A method according to claim 12, wherein said coherent light has a coherence length, and said chamfer has a chamfer width equal to or greater than half of said coherence length.

14. A method of eliminating edge-ringing due to interference effects from coherent light passing through a light tunnel having a hollow light tunnel body with an inner reflective surface and an output end having an inner surface edge, comprising the steps of:
   a) providing a chamfer on the inner surface edge; and
   b) passing the coherent light through the light tunnel at different angles, with a portion of the coherent light passing immediately adjacent said chamfer or reflective from said chamfer.

15. A method according to claim 13, wherein said coherent light has a coherence length, and said chamfer has a chamfer width equal to or greater than half of said coherence length.

16. A method of providing uniform illumination using a light tunnel with a knife-edge placed at an output end of the light tunnel, the method comprising the steps of:
   a) providing a laser light source having an $M^2$ value greater than 30; and
   b) passing light from said laser light source through said light tunnel over a range of angles.

17. A method according to claim 16, wherein said light source further has an etendue greater than 50 mm-mrad.

* * * * *